W. J. LANE.
Gearing for Driving Sewing, and other Light Machines.
No. 165,338.  Patented July 6, 1875.
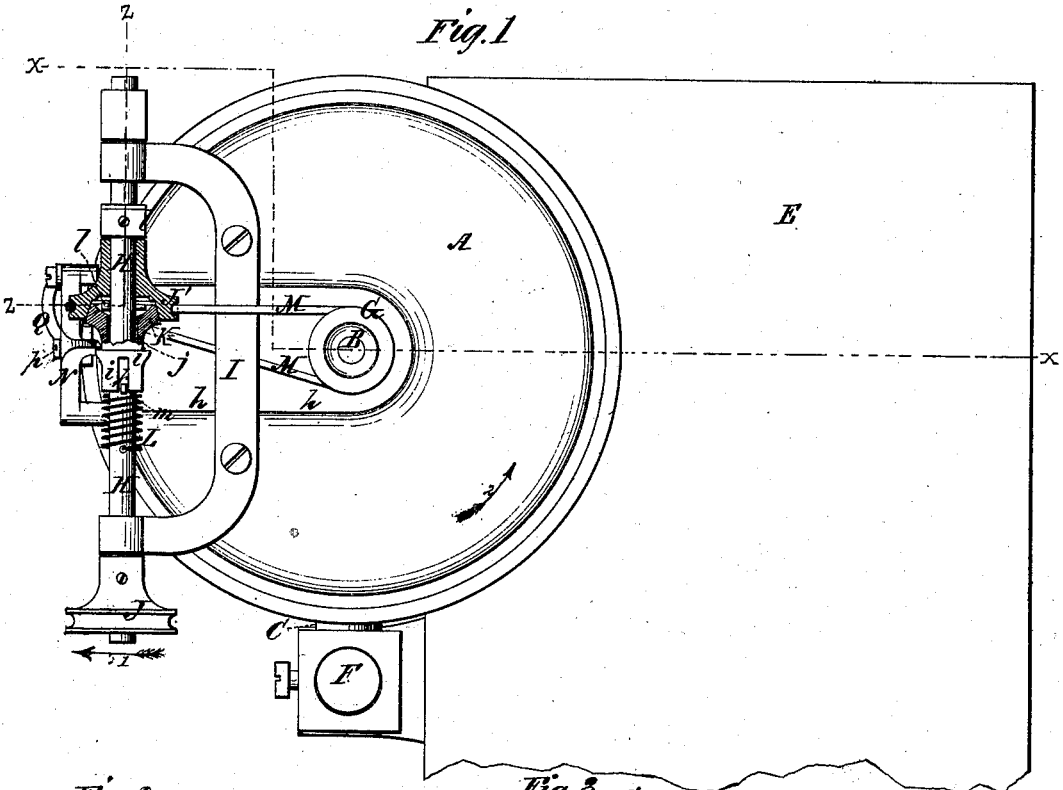
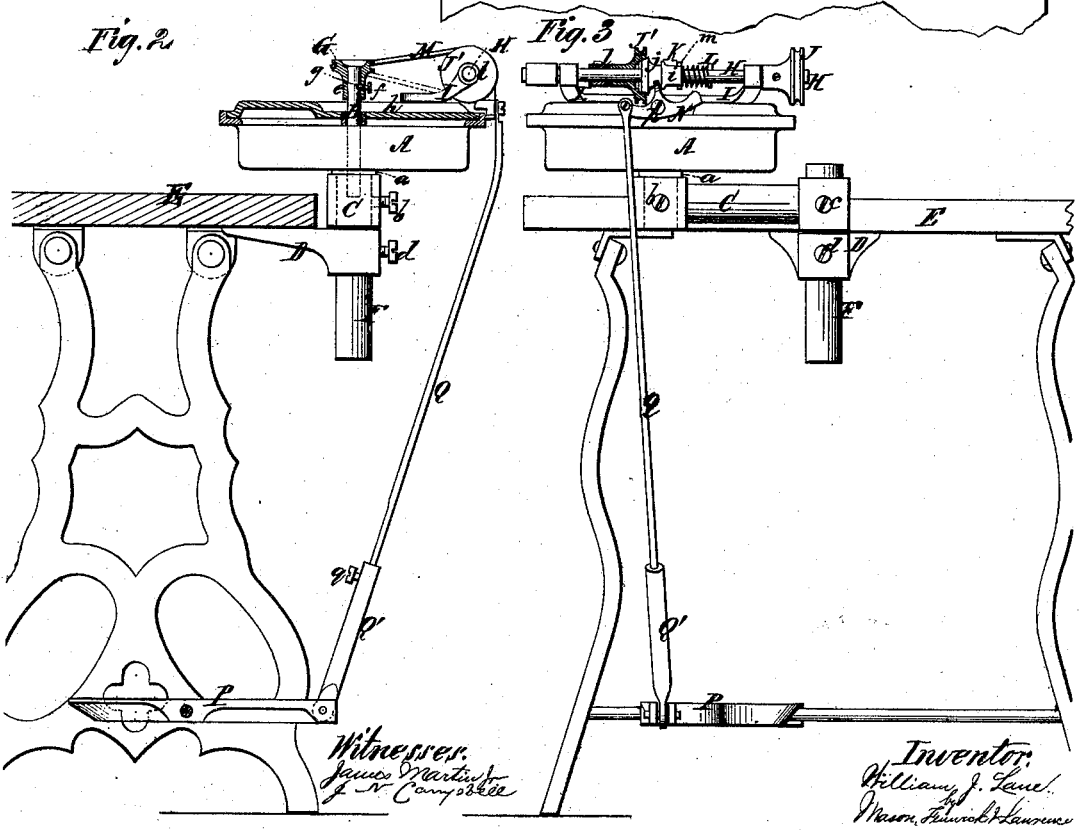
Witnesses.
Inventor:
William J. Lane

UNITED STATES PATENT OFFICE.

WILLIAM J. LANE, OF MILLBROOK, NEW YORK, ASSIGNOR TO LANE BROTHERS, OF SAME PLACE.

IMPROVEMENT IN GEARINGS FOR DRIVING SEWING AND OTHER LIGHT MACHINES.

Specification forming part of Letters Patent No. 165,338, dated July 6, 1875; application filed May 28, 1875.

*To all whom it may concern:*

Be it known that I, WILLIAM J. LANE, of Millbrook, county of Dutchess and State of New York, have invented a new and useful Improvement in Gearing for Sewing and other light Machines; and I do hereby declare that the following is a full, clear, and exact description thereof, reference being had to the accompanying drawings making part of this specification, in which—

Figure 1 is a top view and partial horizontal section of my improved apparatus as applied to a sewing-machine table. Fig. 2 is a vertical section of the same in the line $x$ $x$ of Fig. 1. Fig. 3 is an elevation and partial section in the line $z$ $z$ of Fig. 1, looking from the back of a sewing-machine table.

My present improvements are specially designed for use in connection with the water-motor for driving sewing-machines and other light machines, for which a patent was allowed me May 10, 1875; but they may be used in connection with other descriptions of motors for driving such machines.

The nature of my invention consists in certain constructions and combinations of parts, as hereinafter described and specifically claimed, whereby the belt leading from the wheel or power shaft to a counter-shaft can be run on a quarter-twist, so as to drive the counter-shaft in two different directions without the necessity of taking the belt off from its pulleys; and whereby, also, the counter-shaft can be thrown out of frictional contact and gearing-connection with the wheel or power shaft, and its motion stopped, without stopping the wheel or power shaft, by pressing the foot upon the treadle of the machine being operated; and whereby, likewise, the counter-shaft is instantly and automatically thrown again into gearing-connection with the wheel or power shaft by withdrawing the foot from the treadle of the aforesaid machine being driven; and whereby, further, convenience of supporting the counter-shaft by the wheel-case is secured, and facilities are afforded for connecting the device which throws the counter-shaft in and out of gear with the wheel-shaft to the treadle of the machine to be driven, when the distance of the shifter from the treadle is greater or less, according to the height of the machine.

A is a water-wheel case, with a water-wheel arranged to revolve in it on a shaft, B, the same as in my aforesaid motor, for which a patent was allowed me May 10, 1875. This case A has a boss, $a$, on its under side, and by means of this boss it is connected to a swinging arm, C, which is connected to a bracket, D, of a sewing-machine table, E, by means of a pivot, F. The arm C has an eye at each end, and the bracket D has a similar eye on one of its ends. The boss of the wheel-case is fastened in its eye by means of a screw, $b$, and the arm C and pivot F are connected together and to the bracket by screws $c$ $d$. By this means the case can be turned on the arm so as to bring the parts connected to it in any position desired, and the case can be adjusted and fastened on the bracket D at any altitude required, for, by loosening the screws, the parts can be slipped or turned as occasion requires, and again be confined by fastening the screws.

The wheel-shaft B has a pulley, G, fastened to it by means of a sleeve, $e$, and set-screw $f$. The sleeve of this pulley is made of such a length that by inverting the pulley so that the sleeve comes under the pulley, instead of above it, the belt which transmits the power from the wheel-shaft can be made to reverse the motion of the shaft driven without the necessity of taking this belt off its pulleys. The key-hole $g$, which receives the end of the screw $f$, is so located on the shaft B that it receives the screw whether the pulley G is adjusted to a position which brings its sleeve below or above the pulley. H is a counter-shaft, hung on the arms of a yoke-bracket, I, screwed to the top of the water-wheel case. This yoke straddles a countersunk portion, $h$, of the top of the water-wheel case, and its arms or ends extend upward and outward to about the circumference of the said case A, and terminate in bearing-boxes for the shaft H, which shaft is passed through said boxes and properly confined, so as to revolve in said boxes. On the shaft H pulleys J and J' are arranged. The pulley J' is fitted loosely, and the pulley J is fastened permanently. The loose pulley J' has a conical recess cut into its face, into which recess a sliding conical friction-clutch, K, fits snugly, and holds the pulley, by frictional contact, from turning independently of its shaft H, when desired. The clutch has a sleeve-extension, $i$, and this is formed with a groove, $i'$, in its periphery, and with longitudinal slot $k$, as shown. Stops $l\ l$ hold the pulley J' from moving longitudinally, and a stop-pin, $m$, which is in the shaft H, and fits in the slot $k$, prevents the clutch K from turning, and allows said clutch to slide on the shaft H when desired.

A spiral spring, L, wound on the shaft H, holds the clutch firmly in gear with the pulley J' so long as its action is not interfered with by the operator. M is a belt passed on a quarter-twist from the pulley of the shaft B to the pulley of the shaft H. The belt, as shown, turns the shaft H in the direction of the arrow 1. By reversing the pulley and retaining the quarter-twist the shaft will be turned in an opposite direction. N is a rocking shifter, pivoted, as at $p$, to the edge of the cap of the water-wheel case. This shifter has two arms and a central tripping-toe. The arms are shaped to form stops which strike upon the water-wheel case, and thus control its up and down movement. The central toe extends up into the groove $i$ of the clutch, and moves the clutch longitudinally away from the pulley J', when the shifter is rocked on its pivot $p$. One arm of the shifter is connected to the rear end of a treadle, P, of a sewing-machine by means of a pitman, Q Q'. The pitman is made of two parts, one solid and the other tubular. The lower end of the solid part Q extends into the tubular part and is confined by a screw, $q$. By having the pitman in two parts and constructed as shown, it can be lengthened or shortened to suit the altitude at which the water-wheel case is adjusted on the table.

The pitman is so connected to the shifter that the depression of the front of the treadle by the foot of the operator causes the toe to move the clutch out of frictional contact with the pulley J'. This action makes the pulley J' an idle pulley, and at the same time stops the shaft H from revolving, the pin $m$ entering the slot $k$ and instantly arresting the motion of the shaft H. The pulley J' on becoming an idle pulley allows the belt of the water-wheel shaft to continue its revolutions, and thus the water-wheel may keep in motion with the full head of water on, and be ready for instantaneous action when the foot is withdrawn from the treadle.

It is a very important matter to have the motor always ready for action, as it saves time and labor to the operator and prevents jarring. It is also important to have the shifter so combined with the motor that it will be impossible for the operator to leave the machine without also leaving the head of water on, and thus have the motion of the sewing or other machines act as a check against his leaving his work without stopping also the head of water from the wheel by the apparatus which is provided for that purpose. If it were necessary to first cut off the water from the wheel in order to stop the counter-shaft, it would of course be necessary, in starting again, to let on the water for that purpose, and as the wheel has become at rest, its inertia must first be overcome before the operation can proceed. And if the machine must be stopped by arresting the wheel, considerable labor and inconvenience will be experienced in arresting the momentum of the wheel. My method of stopping the counter-shaft and allowing the wheel to continue its motion is found to be a very great improvement over other modes heretofore devised. And the arrangement whereby the machine cannot be started until the operator has withdrawn his foot from the treadle, and in connection therewith having the weight of the treadle, connecting-rod, and shifter—aided by the spring L—serve for automically bringing the clutch into gearing-contact with the pulley J', and thus effect the gearing of the shaft of the water-wheel with the counter-shaft without jar or backlash, is a very important improvement over other modes, especially those designed for sewing-machines which require frequent stopping and starting.

With my arrangement, a very slight motion of the treadle is sufficient, a very slight pressure is required, and yet great promptness of action is secured.

What I claim as my invention is—

1. The combination of a motor-shaft, B, a loose pulley, J', a clutch, K, a counter-shaft, H, a shifter, N, a pitman, Q, and a treadle, P, whereby the counter-shaft is ungeared from the water-wheel or power-shaft and its motion arrested without stopping the power-shaft B, and the said shafts again geared with each other, by the simple application and withdrawal of the pressure of the foot of the operator from the treadle, substantially as and for the purpose described.

2. The rocking-shifter N, in combination with the friction-clutch K with its slotted sleeve, loose pulley J', and shaft H with its pin $m$ and spring L, whereby the shaft H is stopped as soon as it is ungeared from the power-shaft, substantially as and for the purpose described.

3. The counter-shaft H supported on a yoke attached directly to the motor-case, substantially as described.

4. The shifter N constructed with stopping-lugs on its arms pivoted to and supported directly by the motor-case, substantially as described.

5. The combination of the motor-case with its revolving shaft B, a treadle, P, and a disconnecting shifter N, substantially as described.

6. The extensible pitman, in combination with the arm and pivot by which the motor-case with its revolving shaft is connected to the sewing-machine table at different altitudes, substantially as described.

7. In combination with the quarter-twist belt and the pulley J', the pulley G with its sleeve, made reversible on the shaft B and fastened in place by a screw-pin which enters the same key-seat in both adjustments of the pulley, substantially as described.

WILLIAM J. LANE.

Witnesses:
W. H. SPEAR,
H. T. TRIPP.